United States Patent Office 3,634,373
Patented Jan. 11, 1972

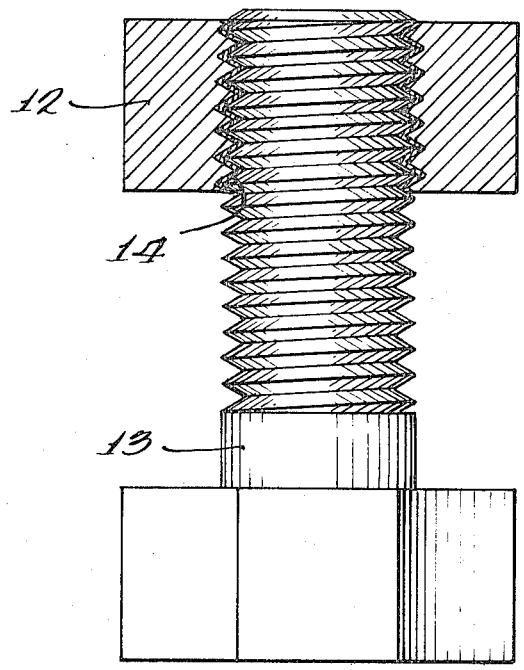

3,634,373
SEALANT COMPOSITIONS COMPRISING ESTERS OF CYCLIC ETHER ALCOHOLS AND PEROXY CATALYSTS
John R. Stapleton, 1017 Elmwood, Wilmette, Ill. 60091
Continuation-in-part of application Ser. No. 659,020, Aug. 8, 1967, now Patent No. 3,479,246, which is a continuation-in-part of applications Ser. No. 521,439, Jan. 18, 1966, and Ser. No. 524,211, Feb. 1, 1966. This application also being a continuation-in-part of applications Ser. No. 524,211, and Ser. No. 517,321, Dec. 29, 1965. This application Jan. 19, 1969, Ser. No. 813,779
Int. Cl. C08f 3/62, 15/16
U.S. Cl. 260—86.1
13 Claims

ABSTRACT OF THE DISCLOSURE

A cyclic ether alcohol ester of an acrylic acid is used as a room temperature curing monomer in a shelf stable fast curing sealant composition which contains a peroxide catalyst and cures when placed between facing ferrous metal surfaces.

RELATION TO COPENDING APPLICATIONS

This application is a continuation-in-part of my copending application Ser. No. 659,020 now U.S. Pat. No. 3,479,246 entitled "Catalyzed Room Temperature Curing Shelf Stable Sealing Compositions" filed Aug. 8, 1967 which is in turn a continuation-in-part of copending application Serial No. 521,439 now abandoned entitled "Sealant Composition" filed Jan. 18, 1966 and copending application Serial No. 524,211 now abandoned entitled "Sealant for Elevated Temperature Use" filed Feb. 1, 1966. This application is also a continuation-in-part of said copending application Serial No. 524,211 now abandoned and application Serial No. 517,321 now abandoned, entitled "Adhesive Composition for Metals and The Like" filed Dec. 29, 1965.

BACKGROUND OF THE INVENTION

Field of the invention

This invention relates to sealants containing a liquid monomer and a catalyst. The sealants are shelf-stable but are capable of setting up at room temperature when placed between closely facing metal surfaces.

Prior art

Sealant compositions are liquid solventless adhesives usually used for adhering metal surfaces to each other. They can be put to a variety of specific uses such as for adhering a nut to a bolt, mounting a bearing, adhering metal slip fits, abutting joints and threaded joints such as on pipes and pipe fittings.

Heretofore commercial sealants have used as the basic monomer a diacrylic ester of a polyethylene glycol or the like. Such monomers, when used in combination with certain hydroperoxides, has been found to be shelf-stable during storage conditions but capable of polymerizing in contact with metal surfaces.

During the prosecution of some of the above copending applications, Reinhardt U.S. 3,256,254, has been considered as a prior art reference. Reinhardt teaches compositions containing oxycarboxylic esters of acrylic acid which undergo rapid polymerization in the presence of air. These are not sealant compositions, are not shelf-stable and are not initiated to cure by closely facing metal surfaces.

BRIEF DESCRIPTION OF THE DRAWING

The figure illustrates one use of the sealant of the present invention.

SUMMARY OF THE INVENTION

This invention provides a sealant composition which includes at least two essential ingredients. These are an acrylic ester of a cyclic ether alcohol, preferably tetrahydrofurfuryl alcohol, which functions as a room temperature setting monomer and a peroxidic catalyst which can be either an organic hydroperoxide, hydrogen peroxide, or certain of the true peroxides, as distinguished from hydroperoxide, and perester catalysts. The useful peroxide and perester catalysts have the structural formula $$XO[OYO]_nOZ$$

In the formula $n$ is 0 or 1; X is selected from t-butyl and hydroxycyclohexyl; Y is the residue of an organic dicarboxylic acid having its atoms selected from carbon, hydrogen and oxygen; and Z is aliphatic hydrocarbon or composed of carbon, hydrogen and oxygen such as hydroxy-aliphatic-hydrocarbon, hydrocarbon ether or aliphatic acyl, with a carbon atom linked directly to the peroxy oxygen of the formula. In one form of the invention, a crosslinking monomer having at least two acrylic type groups is included in the sealant. The monomer itself functions as the solvent for any soluble ingredients in the sealant, so significant amounts of volatile solvent are not used and there is no need for removal of volatile solvents to produce a bond.

DESCRIPTION OF THE PREFERRED EMBODIMENTS

The compositions of this invention contain, as a room temperature reactive monomer, an acrylic ester of a cyclic ether alcohol and are useful in adhering closely facing surfaces, usually metal, to each other. Close contact of the sealant composition with the metal surfaces apparently results in initiating the cure of the monomer. The ester can be readily prepared by esterifying the alcohol with an acrylic acid, e.g. substituted acrylic acid such as methacrylic, ethacrylic, chloroacrylic, and like acids, by known esterification reactions under conventional conditions for such esterifications. When conducting the esterification, it is normal to include an inhibitor such as hydroquinones to suppress reaction, e.g. polymerization, of the unsaturated group of the acrylic acid. It is also usual to conduct the esterification in the absence of oxygen, e.g. under a blanket of inert gas such as nitrogen or carbon dioxide or while bubbling inert gas through the reaction mass. Esterification catalysts such as toluene sulfonic acid can also be used. A particular ester, as desired, can be ordered from stock or can be prepared by chemical supply houses or laboratories specializing in such preparations. One such ester which is especially useful in tetrahydrofurfuryl methacrylate which is commercially available as Resin SR-203 from Sartomer Resins, Inc., Essington, Pa. This ester, as supplied, contains 60 p.p.m. hydroquinone as an inhibitor and is reported to have the following structural formula:

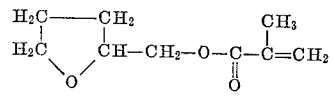

and the following specifications:

Color, APHA: 100
Molecular weight: 170
Refractive index $N_d^{25}$: 1.4554

Density at 25° C.: 1.040
Viscosity at 25° C.: 2.5 cps.
Shrinkage on polymerization: 12.5%

The acrylic esters of cyclic ether alcohols are the esters of an acrylic acid of the structure $CH_2=C(R)COOH$ and a cyclic ether alcohol, and the esters include, but are not limited to, the acrylic esters of such alcohols as furfuryl alcohol, tetrahydrofurfuryl alcohol, furfurylidene methanol, 5 - hydroxy - 2(hydroxymethyl)-1,4-pyrone, methyl isosaccharate, 2,5 - dihydroxy - pyrone, 4-benzofuryl-hexanol, 2-hydroxyethyl-chromone, 2-hydroxymethyl-1,3-dioxane, 2-hydroxy-1,4-dioxane, 2-hydroxymethyl-1,3-dioxolane, 1-hydroxy-2,3-epoxypropane, 1-hydroxyethoxy-2,3-epoxypropane, 1,2-epoxy-2-hydroxymethyl-3-hydroxypropane, 3,7,3',4'-tetrahydroxyflavone, 2,4,6-trihydroxymethyl-1, 3,5-trioxane, 2-hydroxybenzoxazole, etc. The esters can be mono-, di-, tri-, tetra-, etc., esters, but the mono- and di-esters are preferred. The cyclic ether alcohols include the structure C—O—C in the cyclic ether portion, wherein the carbon atoms form at least part of an interconnecting linking chain. The linking chain can be saturated or unsaturated, substituted or unsubstituted, and can be formed in part or in whole as portions of one or more cyclic, e.g. aromatic, nuclei. In an advantageous form, the cyclic ether portion is hydrocarbon, hydrocarbon ether, or hydroxy substituted hydrocarbon or hydrocarbon ether, e.g. substituted with hydroxy groups attached directly to the chain or to a substituent hydrocarbon group on the chain; in such form the cyclic ether portion can be illustrated as containing the structure:

wherein L denotes a direct bond between the two carbon atoms or a linking chain in which the backbone of the chain is composed of carbon atoms alone or carbon atoms plus ether oxygen atoms. Preferably, the cyclic ether portion is tetrahydrofurfuryl and the preferred esters are the esters of tetrahydrofurfuryl alcohol such as tetrahydrofurfuryl methacrylate, tetrahydrofurfuryl acrylate, and tetrahydrofurfuryl ethacrylate. Other suitable esters are given by Reinhardt in U.S. Pat. No. 3,256,254, the disclosure of which is incorporated herein by reference.

In the acrylic portion of the ester, the nature of R is unimportant. It can be hydrogen, halogen, hydroxy, or substituted or unsubstituted saturated or unsaturated hydrocarbon. Preferably, R is hydrogen, halogen or lower alkyl, i.e., $C_1$ to $C_5$, because of the more ready availability of such acrylic acids. The halogens are chlorine, iodine, fluorine and bromine.

To prepare the present sealant compositions, it is merely necessary to mix with the ester a suitable amount of a useful peroxide-type catalyst. Metal containers should not be used because of the chance of premature polymerization. The useful catalysts include the organic hydroperoxides, hydrogen peroxide, certain peresters and certain peroxides. The peresters and peroxides must fall within the above $XO[OYO]_nOZ$ formula to be useful. The peroxide-type catalyst is used in a small amount, e.g., in the range of .01 to 15% or more, and preferably .1 to 5%, in the sealant composition to cause the ester to set up within a reasonable period of time, e.g., less than 12 hours, and preferably less than 3 hours, at room temperature (70° F.), when the sealant composition is placed between closely facing ferrous metal surfaces. Examples of suitable organic peroxides are cumene hydroperoxide, t-butyl hydroperoxide, methylethylketone hydroperoxide, tetralin hydroperoxide, 1-hydroxy-1'-hydroperoxy dicyclohexyl peroxide, 2,5-dimethylhexyl-2,5-dihydroperoxide, ditertiary butyl diperphthalate, t-butyl peroxymaleic acid, t-butyl peracetate and bis (1-hydroxycyclohexyl) peroxide, and the like.

Inhibitors or stabilizers can be added as needed to balance or prevent instability of the sealant. Hydroquinone is a preferred inhibitor and stabilizer because of its availability and effectiveness to inhibit until it is desired to set up sealant composition between the closely facing metal surfaces in the absence of air. It has been reported that hydroquinone relies somewhat on the presence of oxygen for its inhibitor effect. Hydroquinone, in a total amount of 20 to 2000 p.p.m., more usually 60 to 600 p.p.m., will probably be sufficient to stabilize most sealant compositions containing the ester. Other conventional inhibitors or stabilizers for inhibiting polymerization of vinyl compounds can be used as will be apparent to those in the art. Volatile solvents are not used in significant amounts, i.e., any amounts where they may actually function as a solvent for the monomer or for the set-up polymer of the bond.

It is intended that other polymerizable unsaturated esters or other unsaturated monomers such as hydrocarbons, ethers, or other comonomers, can be included in the present sealant compositions to modify the properties of the composition. The composition should not include material amounts of water or non-polymerizable solvents which may dilute the monomer, or dilute the desired bond strength, or decrease the desired cure rate.

In an advantageous form of the present invention, polymerization or cure rate regulators can be included in the compositions, e.g., in amounts of .001 to 10% by weight and preferably 0.01 to 5% by weight based on total monomer in the sealant composition. Such regulators are those compositions normally considered to be accelerators for polymerization of ethylenically unsaturated monomers using peroxidic catalysts. Useful accelerators or promoters including the nitrogen-containing compounds disclosed by Frances E. Knock in U.S. Pat. No. 2,558,139. As disclosed by Knock, these promoters have varying degrees of activity, i.e. some provide very slow polymerization rates and others provide very fast polymerization rates when employed in conjunction with the catalyst. Briefly, the regulators can be, but are not limited to, for example, the alkylol amines, tertiary amines, organic amides, organic imides, organic sulfimides, carbamates, etc.

Some of the regulators may actually function as polymerization catalysts and some may function as inhibitors in the absence of the peroxide-type catalyst. The Knock patent relates the activities of such promoters to specific monomers with which Knock has worked, but it has been further found that where the monomers of the present invention are used, the order of reactivity is not necessarily the same as that indicated by Knock. For example, saccharin has been found to be an excellent promoter and even a polymerization catalyst in itself for the monomers of the present system, while Knock classifies saccharin as a slower promoter. As another example, the anilines appear to be excellent promoters for both the Knock compositions and the present monomers. Also, some of the Knock promoters may have an adverse effect on the stability of the present compositions. Some of the promoters described by Knock do not promote the polymerization but actually slow the polymerization rate, but such promoters of Knock are also useful in the present compositions since it is sometimes desired to provide products having slower polymerization rates than those obtained using the catalyst alone.

The useful polymerization regulators for the compositions of this invention include the compounds of the fifteen classes of compounds disclosed by Knock. Many specific examples are given by Knock, and it is merely necessary to include a small amount of the regulator in a formulation of the present invention and observe its effect during test use of the composition.

The following examples are offered for the purpose of illustration and are not intended as limiting the invention. In each example, the listed ingredients in the amounts and order indicated were added to and mixed in a small polyethylene bottle and the bottle was then plugged with a dispenser top having a drop dispensing spout.

EXAMPLES 1–3

In each of the Examples 1–3, 0.15 gram of the peroxide catalyst identified below was added to 2 grams of tetrahydrofuryl methacrylate.

| Example: | Peroxide |
|---|---|
| 1 | Cumene hydroperoxide. |
| 2 | Menthane hydroperoxide. |
| 3 | Tertiary butyl hydroperoxide. |

EXAMPLES 4–7

In each of Examples 4 through 7, Example 1 was repeated except that 0.1 gram of the accelerator indicated below was added.

| Example: | Accelerator |
|---|---|
| 4 | Benzoic sulfimide. |
| 5 | Formamide. |
| 6 | Benzene sulfonamide. |
| 7 | N,N-dimethylaniline. |

EXAMPLE 8

Example 4 was repeated except that 0.4 gram Dapon-35 was added.

EXAMPLE 9

Example 4 was repeated except that 0.7 gram Dapon-35 was added.

EXAMPLE 10

Example 5 was repeated except that 0.4 gram Dapon-35 was added.

Accelerated shelf life tests were conducted on samples of Examples 1–3, 6, 7, 9 and 10 in order to determine the storage stability of representative compositions. In accordance with the test procedure, each composition was placed in a polyethylene bottle and aged in an oven maintained at about 81° to 82° C. If the composition gelled, the time was noted. The test is an accelerated aging test and, as a correlation of the test procedure with actual storage conditions, a sealant composition free from gelling after 30 minutes under the aging conditions of the test will also be free from gelling under ambient or room temperature for at least one year. The test was discontinued after 90 minutes. The times for gelling of each sample are noted below. A gelling time of 90+ minutes indicates that the sample did not gel prior to termination of the test.

Table I.—Accelerated shelf life tests

| Composition: | Time to gel at 82° C., minutes |
|---|---|
| 1 | 90+ |
| 2 | 90+ |
| 3 | 90+ |
| 6 | 90+ |
| 7 | 90+ |
| 9 | 90+ |
| 10 | 90+ |

EXAMPLE 11

0.1 gram tertiary butyl hydroperoxide and 0.1 gram benzoic sulfimide were added to 2 grams tetrahydrofurfuryl methacrylate.

EXAMPLE 12

0.1 gram tertiary butyl hydroperoxide and 0.1 gram N,N-dimethylaniline were added to 2 grams tetrahydrofurfuryl methacrylate.

EXAMPLE 13

0.1 gram tertiary butyl hydroperoxide and 0.1 gram benzoic sulfimide were added to a mixture of 1.5 gram tetrahydrofurfuryl methacrylate and 0.5 gram of a diallylphthalate prepolymer powder marketed by FMC Company under the trade name Dapon-35.

EXAMPLE 14

0.1 gram tertiary butyl hydroperoxide and 0.1 gram N,N-dimethylaniline were added to a mixture of 1.5 gram tetrahydrofurfuryl methacrylate and 0.5 gram of a diallylphthalate prepolymer powder marketed by FMC Company under the trade name Dapon-35.

EXAMPLE 15

Equal parts of Examples 11 and 12 were mixed.

EXAMPLE 16

Equal parts of Examples 13 and 14 were mixed.

After each of the above formulations was prepared, the dispenser top was placed on the bottle, and the ingredients were mixed by shaking and were permitted to stand for 1 to 2 hours for better solubility of the ingredients. The formulations of the examples were then subjected to a "finger-tight" locking test. Accordingly, 3 small drops of each formulation were dispensed on the exposed threads of each of a plurality of degreased 3/8–24, 1 inch medium carbon steel cap screws on each of which a degreased medium carbon steel nut had been threaded up close to the cap screw head. The nut was then backed off until it was within the area of threads to which the formulation had been applied. The cap screw was then placed head down on a level surface and allowed to stand. A separate cap screw for each formulation was checked after expiration of a different time interval; and when a nut was found to be "finger-tight," i.e., the nut could not be manually turned relative to the cap screw without the aid of a wrench or other tool, the time was recorded. It was also noted whether the nuts were loose or showed resistance to turning. The results are reported in Table II, with "l" indicating loose nuts, "r" indicating resistance, and "ft" indicating finger-tight.

TABLE II

| Example | Times checked | | | | |
|---|---|---|---|---|---|
| | 30 min. | 1 hr. | 2 hrs. | 2½ hrs. | 3 hrs. |
| 1 | l | l | | ft | |
| 2 | | l | | | ft |
| 3 | l | l | | l | l |
| 4 | r¹ | ft | | | |
| 5 | l | r¹ | | ft | |
| 6 | l | r¹ | | ft | |
| 7 | l | r | | ft | |
| 8 | | ft | | | |
| 9 | r | ft | | | |
| 10 | r¹ | r | | ft | |
| 11 | l | l | l | | ft |
| 12 | l | l | r | | ft |
| 13 | l | | l | | ft |
| 14 | l | r | r² | ft | |
| 15 | | ft | | | |
| 16 | ft | | | | |

¹ Slight resistance.
² Almost finger tight.

The strength of the bonds between the nuts and cap screws for representative ones of the above examples after 24 hours was tested in the following manner: 24 hours after treatment of the cap screw with the sealant, the head of the cap screw was held in a vise with the shank of the cap screw disposed vertically. A torque wrench was applied to the nut, and the torque required to dislodge the nut was noted. The results in Table III are an average of three tests unless otherwise indicated.

Table III

| Example: | Torque, ft. lbs. |
|---|---|
| 1 | 22 |
| 2 | 19 |
| 3 | 21 |
| 4 | 26 |
| 5 | 11 |
| 6 | 21 |
| 7 | 16 |
| 8 | 31 |
| 9 | 22 |
| 10 | 16 |

The temperature conditions during the preparation and testing of all sealant compositions herein were in the range of about 70° F. to 75° F.

Although the above examples used tetrahydrofurfuryl methacrylate as the monomer, similar results are obtained with tetrahydrofurfuryl acrylate, ethacrylate and chloroacrylate. Further, advantageous results are obtained when the tetrahydrofurfuryl methacrylate of the above examples is replaced by furfurylacrylate, furfurylidene methylethacrylate, the dimethacrylate of 5 - hydroxy - 2 - (hydroxymethyl) - 1,4 - pyrone, the diacrylate of tetrahydro-3,4 - dihydroxy - 2,5 - dicarboxymethyl furan, 2,5-dihydroxy pyrone chloroacrylate, 2-hydroxymethyl dioxane methacrylate, 2,3-epoxypropyl methacrylate, and other acrylic esters of cyclic ether alcohols, e.g., those disclosed hereinabove.

The sealant composition can be used to bond similar or dissimilar metal surfaces. The surfaces are usually ferrous metal surfaces, although the compositions are useful in bonding such other metals as brass, copper and tin. Zinc and cadmium, used as corrosion-resistant coatings on other metals, are less active metals and may require the use of a primer to activate the metal before applying the sealant. Suitable such primers are available commercially.

Many advantages of the present sealant composition have been discussed above; briefly, there is provided a sealant composition which is shelf stable for an extended period of time but which sets up when closely contacted or confined between metal surfaces. The sealant compositions are receptive of a variety of addition agents, including polymerization regulators which can be used to speed or slow the cure rate. Among other addition agents, it has been found that the sealant compositions of this invention are fully compatible with a full range of plasticizers, including esters of phthalic acid, waxy plasticizers, etc. Thixotropic sealant compositions have been prepared merely by adding a thioxotroping agent such as a silica gel, e.g. Cab-O-Sil. Further, the cyclic ether ester is fully compatible with other monomers and even shows excellent ability of solubilizing normally solid allylic prepolymers, acrylic polymers, and viscous alkyld materials. In such cases where the viscosity of the cyclic ether is very low, it may be very desirable to add such other monomers for thickening the sealant material. The addition of other such monomers has sometimes been found to dilute or slow the polymerization rate and has sometimes been found to speed the polymerization rate. Simple experimentation is all that is required to find a suitable monomer for a particular sealant composition.

Where the ester of the cyclic ether alcohol is a monoacrylic ester, such as the especially preferred tetrahydrofurfuryl methacrylate, it is preferred to include a cross-linking agent to improve high temperature resistance of the bond after the sealant sets up between the metal surfaces. Often, in the absence of the cross-linking agent, the bond strength of the room temperature cured sealant decreases to less than one-half of its 24 hour cured bond strength when subjected to such elevated temperatures as 300° F. Copolymerizable polyacrylic ester monomers are preferred cross-linking agents because they do not materially adversely affect the speed of room temperature cure or the shelf stability of the cyclic ether alcohol ester when used in proper amounts.

The polyacrylic monomer is an ester of an acrylic acid and a polyhydric alcohol. Such esters are well known and the examples below are given merely as a guide to those in the art, it being understood that a variety of such esters may be used as will be recognized by those in the art. Examples include ethylene glycol dimethacrylate, ethylene glycol diacrylate, ethylene glycol dichloroacrylate, trimethylol methane, ethane or propane dimethacrylate, di(chloroacrylate), triacrylate or trimethacrylate, glycerol diacrylate, glycerol tri(chloroacrylate), glycerol trimethacrylate, pentaerythritol di-, tri- or tetramethacrylate, tetramethylene glycol dimethacrylate, glycerol dimethacrylate, 1,4-dihydroxy-2-butene dimethacrylate, trimethylol hexane methacrylate diacrylate 1,12-dihydroxy dodecane dimethacrylate, trimethylol cyclohexane triacrylate, dimethylol cyclohexane dimethacrylate, 1,4-dihydroxy hexane dimethacrylate, etc. Although the present system functions with polyalkylene glycol esters, such as esters of tetraethylene glycol or similar polyhydric alcohols having ether groups in the chain directly connecting the hydroxy groups, these esters appear to give adequate speed of cure and cross-linking in themselves so that no particular advantage is attained by mixing them with the cyclic ether esters. The esters may be used singly or in combination and need not be highly purified. Commercial grades of the esters are entirely satisfactory.

The preferred polyacrylic monomers are the normally liquid polyesters, including di-, tri-, tetra-, etc. esters, of an acrylic acid having the formula $CH_2=C(R)COOH$ and a polyhydric alcohol in which the polyhydric alcohol is an open chain polyol, such as one having the formula $R'(OH)_x$ wherein $x$ is at least 2 and preferably 2 to 4 and $R'$ is a carbon-to-carbon non-ether chain, preferably saturated, linking the hydroxy groups. Such polyols include, but are not limited to, the di-, tri- and tetramethylol hydrocarbons, ethylene glycol, glycerol, and the like.

The monomer mixtures containing the polyacrylic cross-linking agent should contain a sufficient amount of the monoacrylic cyclic ether alcohol ester to give the desired rate of room temperature cure initiation and a sufficient amount of the polyacrylic ester to provide the desired high temperature and/or improved bond strength properties. Usually the ratio of monoacrylic ester to polyacrylic cross-linking ester will be greater than 1:10 and up to 10:1, more advantageously greater than 2:10, and preferably in the range of 3:7 to 7:3.

The following further examples are given by way of further explanation of this advantageous form of the invention and are not intended as limitations on the invention.

EXAMPLE 17

In this example, 0.5 gram trimethylol propane trimethacrylate and 0.1 gram cumene hydroperoxide were added to 1 gram tetrahydrofurfuryl methacrylate. When tested by the finger-tight test, the composition produced resistance at 2¼ hrs. and was finger-tight at 3¼ hrs. The 24 hour torque was 18 ft. lbs.

EXAMPLES 18–27

As still further unlimiting examples, various monomer combinations were prepared according to this invention using the ingredients and amounts indicated in the table given below. Additionally, to each of Examples 18–27 there was added: 200 p.p.m. hydroquinone as an inhibitor, .5 gram t-butyl hydroperoxide and .2 gram morpholine as an accelerator. Each of Examples 18–27 was tested by the 24 hour torque test. Other sets of nuts and bolts were prepared and tested for torque at 90 minutes and 6 hours. In the table, SR–203 is tetrahydrofurfuryl methacrylate, SR–206 is ethylene glycol dimethacrylate and SR–350 is trimethylolpropane trimethacrylate.

Another set of cap screws was prepared using each of the formulations of Examples 18–27 and permitted to stand 24 hours at room temperature as above, and the cap screws were then placed in an oven at 300° F. for 2 hours. The cap screws were removed from the oven and within 20 seconds after removal were tested for torque. The results for the 24 hour torque and the 24 hour elevated temperature tests for each of Examples 18–27 is also given in the table below.

TABLE

| Ex. | SR-203 (grams) | SR-206 (grams) | SR-350 (grams) | Torque, inch pounds | | | |
|---|---|---|---|---|---|---|---|
| | | | | 90 min. R.T.* | 6 hrs. R.T.* | 24 hrs. R.T.* | 24 hrs. 300° F. |
| 18 | 9.5 | 0.5 | | 3 | 75 | 77 | 30 |
| 19 | 9.0 | 1.0 | | 4 | 50 | 89 | 39 |
| 20 | 8.0 | 2.0 | | 5 | | 79 | 59 |
| 21 | 7.0 | 3.0 | | 9 | 65 | 84 | 98 |
| 22 | 6.0 | 4.0 | | 12 | 25 | 53 | 106 |
| 23 | 3.0 | 7.0 | | 6 | 25 | 53 | 157 |
| 24 | 1.0 | 9.0 | | 4.5 | 6 | 20 | 166 |
| 25 | 0.5 | 9.5 | | 1 | 3 | 9 | 190 |
| 26 | 7.0 | | 3.0 | 27 | 130 | 75 | 139 |
| 27 | 5.0 | | 5.0 | 30 | 85 | 148 | 186 |

*Room Temperature.

The temperature conditions during the preparation and testing of all sealant compositions herein were in the range of about 70° F. to 75° F.

From the above examples, it will be noted that where t-butyl hydroperoxide was used alone as the peroxide catalyst system as in Example 3, the composition was slow in setting initially but had excellent stability and 24 hour torque values. The slowness in initial cure was readily overcome by the use of accelerators as in Examples 11 through 16. One accelerator, i.e., formamide in Example 5, appeared to detract slightly from 24 hour torque values when used with cumene hydroperoxide as can be seen from Examples 7 and 10 although it did improve the finger-tight time.

Comparative compositions were prepared in the same manner as Example 1, except that in comparative composition A methylethylketone peroxide was used as the peroxide catalyst and in comparative composition B, benzoyl peroxide was used as the peroxide catalyst. The methylethylketone peroxide composition survived at least 30 minutes of the accelerated aging test and was gelled by 60 minutes, and the composition was found to be unstable on actual shelf storage under ambient conditions. The methylethylketone peroxide composition gave good 24 hour torque values and was finger-tight within 1 hour in the finger-tight test. The lack of stability could not be cured with known inhibitors. As to comparative composition B, benzoyl peroxide did not give adequate or consistent 24 hour torque values. For example, the initial test of composition B gave a 24 hour torque of 3 ft. lbs. but later tests showed that the catalyst developed only about 5 to 12 inch lbs. and often was not even finger-tight at the end of 24 hours. Although benzoyl peroxide itself did not render the monomer unstable in the accelerated aging test, when accelerators were used in an attempt to increase the initial set time and the 24 hour torque, the composition was rendered completely unstable and gelled at ambient conditions overnight.

This indicates that care should be taken in selecting the peroxidic catalyst since the catalyst system used should be a proper one for permitting room temperature cure while not rendering the composition unstable under shelf storage conditions. Hydroperoxides have been used in sealants based on other monomers and they are useful in the present sealants. Other peroxide catalysts which are useful with the present sealants include, for example, bis-(1-hydroxycyclohexyl) peroxide and the carboxylic acid peresters of the formula

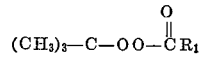

$$(CH_3)_3-C-OO-\overset{O}{\overset{\|}{C}}R_1$$

wherein $R_1$ is an organic radical which is the remaining portion of the carboxylic acid of the perester and selected from the group consisting of aliphatic hydrocarbon and radicals consisting of carbon, hydrogen and oxygen atoms, e.g., carboxylic acid and peresters thereof. More specifically such peresters include di-t-butyl diperphthalate, t-butyl peroxy maleic acid, and t-butyl peracetate. Since these peroxides and peresters are usually slow acting, it is advantageous to use accelerators. Again the accelerator should not be of such a nature or used in such amount as to render the composition unstable. Suitable accelerators have been identified above.

As a procedural guide for determining additional suitable peroxide catalysts, one need only add a small amount of the catalyst, e.g., about 2% by weight to the monomer and subject the mixture to the 82° C. accelerated aging test.

If the sample passes the aging test, another similar sample is prepared and run through the finger-tight and 24 hour torque tests. If the results are satisfactory, a suitable catalyst has been found. If the sample fails the aging test, the catalyst is not suitable. If the sample passes the aging test but fails the finger-tight or torque tests, another sample should be prepared including, in addition to the monomer and peroxide, a suitable accelerator such as saccharin, dimethylaniline, ethoxyethoxyethoxypropyl-amine, formamide, or the like in a small amount, e.g., between .02 and .5% by weight and if the composition now passes the stability, finger-tight and torque tests, a useful peroxide catalyst system has again been found.

The following specific examples illustrate the use of suitable peroxide catalyst systems:

EXAMPLES 28–31

In these examples, 0.5% of the catalyst listed below for each example was added to tetrahydrofurfuryl methacrylate containing .01% added hydroquinone, .05% ethoxyethoxyethoxypropylamine and 0.3% saccharin.

| Example: | Catalyst |
|---|---|
| 28 | Di-t-butyl diperphthalate. |
| 29 | t-Butyl peroxymaleic acid. |
| 30 | Bis(1-hydroxycyclohexyl) peroxide. |
| 31 | t-Butyl peracetate. |

The compositions were tested by the finger-tight, 24 hour torque and accelerated stability tests with the following results:

| Example | Finger-tight | 24 hr. torque, inch pounds | Stability |
|---|---|---|---|
| 28 | 3 hrs | 180 | O.K. at 6 hrs. |
| 29 | 3 hrs | 235 | Do. |
| 30 | 45 min | 245 | Do. |
| 31 | 3 hrs | 215 | Do. |

Of the catalysts used in Examples 28–31, bis(1-hydroxycyclohexyl) peroxide is especially preferred because of its fast set time, good 24 hour torque and good stability.

A sealant composition should be capable of setting up to a finger-tight condition in less than 6 hours and preferably within 3 hours or less. The composition should have an ambient shelf stability of no less than 6 months and preferably at least one year. Often, two years or more stability is desired. Commercial sealant compositions are marketed in varying grades of varying strengths ranging from the weakest grade having a 24 hour torque in the range of 10 to 25 inch lbs. to the strongest grade having a 24 hour torque in the range of 150 to 375 inch lbs., so it is important to be able to provide strength at least in the range of 25 to 150 inch lbs. The lower range strengths can be met by the use of plasticizers in the formulations if necessary. Preferably, the compositions should also develop one-half of their prescribed 24 hour torque within 6 hours.

All percentages given herein are percentages by weight unless otherwise indicated.

The foregoing detailed description is given for clearness of understanding only and no unnecessary limitations are to be understood therefrom, as some modifications will be obvious to those skilled in the art.

What is claimed is:

1. A liquid sealant composition which is relatively stable under room temperature conditions in isolation from contact with metal surfaces and comprising a room temperature reactive liquid acrylic ester monomer consisting essentially of:
(A) a monomer system selected from the class consisting of:
(1) a room temperature reactive monomeric polyacrylic ester of a cyclic ether polyol having at least two hydroxyl groups esterified by an acrylic acid, and
(2) a mixture of:
(a) a room temperature reactive monomeric monoacrylic ester of a cyclic ether alcohol and
(b) a monomer selected from the class consisting of di-, tri-, and tetraesters of an acrylic acid and a polyhydric alcohol, said polyhydric alcohol having the empirical formula $R'(OH)_a$ wherein $a$ is an integer of from 2 to 4 and $R'$ comprises an open carbon chain linking the OH groups,
and:
(B) a peroxidic initiator selected from the class consisting of the organic hydroperoxides and hydrogen peroxide in an amount sufficient to initiate polymerization of said monomer at room temperature on confinement of said sealant between closely facing metal surfaces without adversely affecting storage stability.

2. The composition of claim 1 wherein said room temperature reactive monoacrylic ester is the ester of an acrylic acid of the structure $CH_2=C(R)COOH$, wherein R is selected from the group consisting of hydrogen, halogen and lower alkyl, and a cyclic ether alcohol in which the cyclic ether portion contains the structure:

wherein the hydroxyl group of the alcohol is attached to a carbon atom and L denotes a bridge between the two carbon atoms of the above structure, said bridge being selected from the group consisting of a direct bond and a linking chain in which the backbone of the chain is composed of atoms selected from the group consisting of carbon atoms and ether oxygen atoms.

3. The composition of claim 1 wherein said monomer system is said mixture in which the monoacrylic ester is selected from the class consisting of tetrahydrofurfuryl acrylate, tetrahydrofurfuryl methacrylate, tetrahydrofurfuryl ethacrylate and tetrahydrofurfuryl chloroacrylate.

4. The composition of claim 3 wherein said monoacrylic ester is tetrahydrofurfuryl methacrylate.

5. The composition of claim 1 including a conventional accelerator in an amount sufficient to accelerate the polymerization rate of the monomer between closely facing ferrous surfaces without rendering said composition unstable in the absence of the closely facing ferrous surfaces.

6. The composition of claim 1 wherein said monoacrylic ester and polyacrylic ester are present in a weight ratio of at least about 1:10.

7. The composition of claim 1 wherein said polyacrylic ester of said mixture is ethylene glycol dimethacrylate.

8. The composition of claim 1 wherein said polyacrylic ester of the mixture is trimethylol propane trimethacrylate.

9. As an article of manufacture, a pair of members having metal surfaces which are closely fitting and face each other, and a solid composition comprising a polymer adhering to and set in situ between said metal surfaces by room temperature peroxidic polymerization of the composition of claim 1.

10. The composition of claim 1 wherein said room temperature reactive monoacrylic ester is an ester of tetrahydrofurfuryl alcohol.

11. The composition of claim 1 wherein said room temperature reactive monomer system is said monomeric polyacrylic ester of a cyclic ether polyol identified at (A) (1) in claim 1.

12. The composition of claim 1 wherein said peroxidic initiator is an organic hydroperoxide.

13. The composition of claim 1 wherein said peroxidic initiator is hydrogen peroxide.

References Cited

UNITED STATES PATENTS

| | | | |
|---|---|---|---|
| 2,268,611 | 1/1942 | Mitchell | 260—89.5 |
| 2,403,758 | 7/1946 | Rust | 260—89.5 |
| 2,464,826 | 3/1949 | Neher et al. | 260—86.1 |
| 2,698,863 | 1/1955 | Dickey | 260—86.1 |
| 2,813,127 | 11/1957 | White | 260—86.1 |
| 2,833,753 | 5/1958 | Lal | 260—86.1 |
| 3,046,262 | 7/1962 | Krieble | 260—89.5 |
| 3,234,194 | 2/1966 | Slocum | 260—89.5 |
| 3,249,656 | 5/1966 | Kalinowski | 260—89.5 |
| 3,479,246 | 11/1969 | Stapleton | 260—89.5 |

HARRY WONG JR., Primary Examiner

U.S. Cl. X.R.

117—132; 260—88.3, 88.5